United States Patent
Noda

(10) Patent No.: US 8,901,902 B2
(45) Date of Patent: *Dec. 2, 2014

(54) SWITCHING REGULATOR AND ELECTRONIC DEVICE INCORPORATING SAME

(71) Applicant: Ricoh Company, Ltd., Tokyo (JP)

(72) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 13/646,532

(22) Filed: Oct. 5, 2012

(65) Prior Publication Data

US 2013/0088208 A1    Apr. 11, 2013

(30) Foreign Application Priority Data

Oct. 6, 2011    (JP) .................................. 2011-221556
Sep. 13, 2012   (JP) .................................. 2012-201869

(51) Int. Cl.
*G05F 1/10*    (2006.01)
*H02M 3/158*   (2006.01)
*H02M 1/00*    (2006.01)

(52) U.S. Cl.
CPC ...... *H02M 3/158* (2013.01); *H02M 2001/0003* (2013.01)
USPC ............ 323/271; 323/282; 323/284; 323/285

(58) Field of Classification Search
None
See application file for complete search history.

(56) References Cited

U.S. PATENT DOCUMENTS

| 6,212,079 B1 | 4/2001 | Balakrishnan et al. |
| 8,143,873 B2 * | 3/2012 | Hane .............................. 323/282 |
| 2002/0036909 A1 * | 3/2002 | Fujiyama et al. ................ 363/17 |
| 2007/0024260 A1 * | 2/2007 | Matsuo et al. ................ 323/283 |
| 2007/0152647 A1 | 7/2007 | Liao |
| 2007/0182395 A1 * | 8/2007 | Sakai et al. ................... 323/283 |

(Continued)

FOREIGN PATENT DOCUMENTS

| JP | 2007-159316 | 6/2007 |
| JP | 2010-200450 | 9/2010 |
| JP | 2010-226930 | 10/2010 |
| KR | 102007-0073576 A | 7/2007 |

OTHER PUBLICATIONS

Korean official action dated Oct. 16, 2013 in corresponding Korean patent application No. 10-2012-0109961.
U.S. Appl. No. 13/459,329, filed Apr. 30, 2012, Ippei Noda.

*Primary Examiner* — Timothy J Dole
*Assistant Examiner* — Monica Mata
(74) *Attorney, Agent, or Firm* — Cooper & Dunham LLP

(57) ABSTRACT

A switching regulator switch between an input terminal and an output terminal; a second switch between the output terminal and ground; a switching-time control circuit to generate a first signal when a first period corresponding to a ratio of ON-period of the first switch to a sum of those of the switches has elapsed from a reset-release timing and a reset signal when a second period longer than the first period has elapsed from the rest-release timing; a comparator to generate a second signal when a feedback voltage is smaller than a reference voltage; and a switch control circuit to control the switches so that the first switch is turned off and the second switch is turned on in response to the first signal, and the second switch is turned off and the first switch is fumed on in response to the second signal.

20 Claims, 9 Drawing Sheets

(56) References Cited

U.S. PATENT DOCUMENTS

| | | |
|---|---|---|
| 2009/0066305 A1 | 3/2009 | Noda |
| 2009/0115374 A1 | 5/2009 | Noda |
| 2009/0128116 A1 | 5/2009 | Noda |
| 2010/0046250 A1 | 2/2010 | Noda |
| 2010/0060250 A1 | 3/2010 | Noda |
| 2010/0066333 A1 | 3/2010 | Noda |
| 2011/0043955 A1 | 2/2011 | Noda |
| 2011/0241639 A1 | 10/2011 | Noda |
| 2012/0194149 A1 | 8/2012 | Noda |
| 2012/0274301 A1* | 11/2012 | Nakashima .................. 323/284 |
| 2012/0299562 A1* | 11/2012 | Noda ............................. 323/271 |
| 2013/0285634 A1* | 10/2013 | Bianco ......................... 323/283 |

* cited by examiner

US 8,901,902 B2

SWITCHING REGULATOR AND ELECTRONIC DEVICE INCORPORATING SAME

CROSS-REFERENCE TO RELATED APPLICATIONS

This patent application is based on and claims priority pursuant to 35 U.S.C. §119 to Japanese Patent Application Nos. 2011-221556, filed on Oct. 6, 2011 and 2012-201869 filed on Sep. 13, 2012 in the Japan Patent Office, the entire disclosures of which are hereby incorporated by reference herein.

BACKGROUND

1. Technical Field

The present disclosure relates to a switching regulator to supply a highly precise voltage to a load circuit (e.g., a CPU, etc.), and an electronic device employing the switching regulator.

2. Description of the Related Art

At present, varieties of different applications are typically installed in mobile phones. The applications themselves tend to consume battery power at very high rates, and as a result, a power supply circuit whose external components are compact while at the same time able to handle large currents and low output voltages is needed. In addition, improvements in discharge characteristics of the lithium ion battery used as a primary power supply on the mobile phone side have widened the voltage range available for input to the power supply circuit. Further, it is now common to optimize the operating speed and power consumption of a load circuit (e.g., CPU) connected to an output terminal of the power supply circuit by changing a set voltage of the power supply circuit depending on the operation state of the CPU. Therefore, power supply circuit that can keep the output voltage constant even when an input voltage, an output voltage, or an output current is changed is required.

For example, a first related art proposes a power supply device to avoid deterioration in output voltage characteristics even when an output load current fluctuates. A second related art proposes a DC-DC converter to stabilize a switching frequency. A third related art proposes a switching regulator to be made more compact.

FIG. 6 is a circuit diagram illustrating a conventional switching regulator 1P as the first related art. The switching regulator 1P is one example of a ripple detection-type switching regulator having a switching element whose length of ON-period is fixed. FIG. 7 is a circuit diagram illustrating a switching-time control circuit 3P in the switching regulator 1P shown in FIG. 6. FIG. 8 is a timing chart illustrating operation of the switching regulator 1P show in FIG. 6.

In FIG. 6, the switching regulator 1P includes a switching-element control circuit 2, a comparator 6, the switching-time control circuit 3P, an input terminal TI to which an input voltage VIN is input, an output terminal LX, a switching element SW1 connected between the input terminal TI and the output terminal LX, a switching element SW2 connected between the output terminal LX and a ground voltage, a dividing circuit 7 including a dividing resistor 8 having resistance Rf1 and a dividing resistor 9 having resistance Rf21, and a feedback terminal TF. Further, the switching-element control circuit 2 includes a RS flip-flop circuit 22 and a control-signal generator circuit 23.

Further, in FIG. 7, the switching-time control circuit 3P includes a reference current source 51 that has one terminal connected to the input terminal TI and outputs a predetermined reference current Ic, a capacitor 52 connected between the reference current source 51 and the ground voltage, having a capacitance Cc, a switching element SW5 connected in parallel to the capacitor 52, a voltage source 54 to output a predetermined reference voltage VR, and a comparator 53.

In FIG. 6, the output voltage output from the output terminal LX is output to a load circuit 10 (e.g., CPU) via a high-frequency removal and smoothing low-pass filter 15 constituted by an inductor 12 having inductance L and an output capacitor 14 having capacitance Cout. Herein, a resistor 13 that has resistance Resr is a serial equivalent parasitic resistor of the output capacitor 14. The output voltage VOUT from the low-pass filter 15 is input to the switching regulator 1P via the feedback terminal TF and is divided by the dividing circuit 7. Then, the feedback voltage VF after dividing is output to au inserting input terminal (−) of the comparator 6. The comparator 6 compares the feedback voltage VF with a predetermined reference voltage VREF input from a voltage source 11 to the non-inverting input terminal (+) of the comparator 6. The comparator 6 outputs a low-level switching-time control signal CMPO-P to a set terminal S of the RS flip-flop circuit 22 when the feedback voltage VF is greater than the reference voltage VREF, and outputs a high-level switching-time control signal CMPO-P to the set terminal S of the RS flip-flop circuit 22 when the feedback voltage VF is smaller than the reference voltage VREF. Herein, the high-level switching-time control signal CMPO-P, serving as the second switching-time control signal, indicates a finish timing of an ON-period of the switching element SW2.

With reference to FIG. 7, the switching-time control circuit 3P generates a switching-time control signal TON-P indicating a finish timing of an ON-period of the switching element SW1 for output to a reset terminal R of the RS flip-flop circuit 22. In addition, an output signal PSET from the RS flip-flop circuit 22 is output to the control-signal generator circuit 23. The control-signal generator circuit 23 generates a switching-element control signal PDRV to control switching of the switching element SW1 and a switching-element control signal NDRV to control switching of the switching element SW2 so that the ON-period of the switching element SW1 is finished when the output signal PSET falls, and the ON-period of the switching element SW2 is finished when the output signal PSET rises, and the switching elements SW1 and SW2 are turned on and off complementarily. In addition, the control-signal generator circuit 23 generates an output signal TCHGB1 in synchrony with the switching-element control signal PDRV and outputs the output signal TCHGB1 to the switching-time control circuit 3P. It is to be noted that the switching element SW1 is turned on in response to a low-level switching-element control signal PDRV and is turned off in response to a high-level switching-element control signal PDRV. In addition, the switching element SW2 is turned on in response to a high-level switching-element control signal NDRV and is turned off in response to a low-level switching-element control signal NDRV. The switching elements SW1 and SW2 are controlled so that the switching element SW2 is turned on when the switching element SW1 is turned on and the switching element SW1 is turned on when the switching element SW2 is turned off.

In FIG. 7, the voltage source 54 generates a predetermined reference voltage VR for output to an inverting input terminal (−) of the comparator 53. A voltage VC at a junction node between the reference current source 51 and the capacitor 52 is output to a non-inverting input terminal (+) of the comparator 53. The output signal TCHGB1 is output to a gate of the switching element SW5. Therefore, the switching element SW5 is turned off in response to the output signal TCHGB1 while the switching element SW1 is on. Conversely, the switching element SW5 is turned on while the switching element SW1 is off state. In addition, the comparator 53 compares the voltage VC with the reference voltage VR. The comparator 53 outputs a high-level switching-time control signal TON-P when the voltage VC is greater than the reference voltage VR, and outputs a low-level switching-time control signal TON-P when the voltage VC is smaller than the reference voltage VR.

In FIG. 6, when the feedback voltage VF becomes smaller than the reference voltage VREF, the voltage level of the switching-time control signal CMPO-P output from the comparator 6 becomes high. In response to this operation, the RS flip-flop circuit 22 is set, and the voltage level of the output signal PSET becomes high. Then, the control-signal generator circuit 23 generates the switching-element control signals PDRV and NDRV so that the switching element SW1 is switched on and the switching element SW2 is switched off. In response to this operation, while the switching element SW1 is turned on, the switching element SW2 is turned off, and energy is charged in the inductor 12 by a difference voltage between the input voltage VIN and the output voltage VOUT. Accordingly, an inductor current in the inductor 12 is increased, and the output voltage VOUT is increased by the output capacitor 14 and its serial equivalent parasitic 13.

Subsequently, when the ON-period of the switching element SW1 has elapsed at a predetermined time, the voltage level of the switching-time control signal TON-P changes from low to high. In response to this, the RS flip-flop circuit 22 is reset, and the voltage level of the output signal PSET from the RS flip-flop circuit 22 becomes low. The control-signal generator circuit 23 generates the switching-element control signals PDRV and the NDRV so that the switching element SW1 is turned off and the switching element SW2 is turned on. In response to this, while the switching element SW1 is turned off, the switching element SW2 is turned on, and the energy in the inductor 12 is released by the difference in voltage between the ground voltage and the output voltage VOUT. Accordingly, as the inductor current in the inductor 12 is decreased, the output voltage VOUT is decreased by the capacitor 14 and its serial equivalent parasitic resistor 13.

Herein, a length of the ON-period "ton1" of the switching element SW1 is determined as follows. In FIG. 7, while the switching element SW1 is off state in response to the low-level switching-element control signal PDRV, the switching element SW5 is turned off in response to the output signal TCHGB1 in synchrony with the switching-element control signal PDRV, and the capacitor 52 is charged at the reference current Ic. The comparator 53 compares the voltage VC across the charged capacitor 52 with the reference voltage VR. The comparator 53 outputs the high-level switching-time control signal TON-P when the voltage VC is greater than the reference voltage VR, and outputs the low-level switching-time control signal TON-P when the voltage VC is smaller than the reference voltage VR. In addition, in a period during which the switching element SW1 is off and the switching element SW2 is on, the switching element SW5 is turned on in response to the high-level output signal TCHGB1 from the control-signal generator circuit 23, and the charge in the capacitor 52 is fully discharged.

At this, a length of n ON-period "ton1" of the switching element SW1 is obtained as follows, $$ton1 = Cc \times VR/Ic \quad (1)$$

As described above, in the switching regulator 1P shown in FIG. 6, the length of the ON-period ton1 of the switching element SW1 is determined in response to the switching-time control signal TON-P, and a length of an OFF-period "toff1" of the switching element SW1 is determined by the switching-time control signal CMPO-P from the comparator 6 as a comparison result between the feedback voltage VF and the reference voltage VREF. As described above, by repeating on and off of the switching elements SW1 and SW2, the switching regulator 1P controls the output voltage so that a lime-averaged voltage VOUTa of the output voltage VOUT is set to be constant.

However, in the circuit configuration shown in FIG. 6, since the length of the ON-period ton1 is a fixed value calculated by formula 1, the amount of increase $\Delta\phi$on in magnetic flux of the inductor 12 when the switching element SW1 is on and the amount of decrease $\Delta\phi$off in the magnetic flux of the inductor 12 when the switching element SW1 is off are calculated by the following formulas, using the input voltage YIN, the output voltage VOUT, an on-resistance Ron of the respective switching elements SW1 and SW2, and an inductor current IL of the inductor 12.

$$\Delta\phi on = (VIN - IL \times Ron - VOUT) \times ton1 \quad (2)$$

$$\Delta\phi off = (VOUT + IL \times Ron) \times toff1 \quad (3)$$

In addition, as the amount of the increase $\Delta\phi$on in the magnetic flux is equal to the amount of decrease $\Delta\phi$off therein ($\Delta\phi$on=$\Delta\phi$off), a switching cycle tsw (tsw=ton1+toff1) can be calculated as follows:

$$tsw = \frac{VIN \times ton1}{VOUT + IL \times Ron} \quad (4)$$

Accordingly, a switching frequency fsw holds:

$$fsw = \frac{1}{tsw} = \frac{VOUT + IL \times Ron}{VIN + ton1} \quad (5)$$

As is clear from formula 5, as the input voltage VIN, the output voltage VOUT, the inductor current IL (output current Iout to the load circuit 10) fluctuate, the fluctuation in the switching frequency fsw becomes greater. In addition, the time-averaged voltage VOUTa of the output voltage VOUT cannot be kept constant, which degrades the accuracy of the output voltage.

For example, as illustrated in FIG. 7, representing a first switching cycle tsw1 as a cycle when the output current IOUT is a first current I1, and a second switching cycle tsw2 as a cycle when the output current IOUT is increased to a second current I2 (I1<I2), the second switching cycle tsw2 that is longer than the first switching cycle tsw1 (tsw1>tsw2) because the first current I1 is smaller than the second current I2. In other words, a switching frequency fsw1 when the output current IOUT is the first current I1 is greater than a switching frequency fsw2 when the output current IOUT is the second current I2. As is clear from FIG. 7, when the output current IOUT is increased from the first current I1 to the second current I2, the time-averaged voltage VOUTa of the output voltage VOUT (corresponding to the feedback voltage VF) is decreased. Similarly, as is clear from formulas 4 and 5, when the input voltage VIN or the output current IOUT (corresponding to the inductor current IL) is changed, the switching frequency fsw and the output voltage VOUT are changed.

JP-2010-200450-A proposes a configuration in which a power supply device alleviates the influence from an input voltage, an output voltage, and the output current, and improves the accuracy of the switching frequency. In this example, the power supply device controls respective switching elements based on the input voltage, the output voltage, and the output current to improve characteristics of the output voltage.

FIG. 9 is a circuit diagram illustrating this conventional power supply device 1000. FIG. 10 is a circuit diagram illustrating a $T_{ON}$ generator 102 in the power supply device 1000 shown in FIG. 9. In FIG. 9, the power supply device 1000 includes a current detection circuit 108 to feedback an output current Io. In FIG. 10, the TON generator 102 includes a resistor network to feedback an input voltage $V_{IN}$, operation amplifiers 121 and 127, a resistor network to feedback to an output voltage Vo, and an adder 128 to add a voltage corresponding to the output voltage Vo and a voltage Vs corresponding to the output current Io. With this configuration, the chip size and current consumption may be increased. Therefore, the power supply 1000 is not suitable for the power supply circuit used for the portable device that is required to be compact and energy-efficient (low current consumption.)

In addition, a switching frequency fsw in the power supply circuit 1000 is obtained as below, using an input voltage $V_{IN}$ and an inductor current $I_{LX}$ flowing through a transistor 151, with reference to FIGS. 9 and 10.

$$fsw = V_{IN}/(V_{IN} - I_{LX} \times k) \tag{6}$$

The constant number k in the formula is determined by the element values of the respective elements constituting the current detection circuit 108 and the $T_{ON}$ generator 102. That is, the switching frequency fsw is determined by the values of the input voltage $V_{IN}$ and the inductor current $I_{LX}$, and accordingly, the switching frequency cannot be completely eliminated from dependency on the input voltage $V_{IN}$ and the output voltage Vo. In particular, when an external load Ro is CPU, a load current (output current) precipitously fluctuates continuously. Therefore, the switching frequency fluctuates every time the load current fluctuates, thus generating a switching noise in wide band, which have serious impact on peripheral equipments.

BRIEF SUMMARY

In one aspect of this disclosure, there is a provided novel switching regulator to convert an input voltage into a predetermined output voltage. The switching regulator includes an input terminal; an output terminal; a first switching element; a second switching element; a switching-time control circuit; a first comparator; a switching-element control circuit. The input voltage is input to the input terminal. The output terminal outputs the output voltage. The first switching element is connected between the input terminal and the output terminal. The second switching element is connected between the output terminal and ground. The switching-time control circuit generates a first switching-time control signal indicating finish timing of an ON-period of the first switching element when a first time period, corresponding to a ratio of a length of the ON-period of the first switching element to a sum of lengths of ON-periods of the first switching element and the second switching element, has elapsed from respective reset-release timings. The first comparator compares a feedback voltage corresponding to the output voltage with a predetermined first reference voltage, and generates a second switching-time control signal indicating finish timing of the ON-period of the second switching element when the feedback voltage is smaller than the first reference voltage. The switching-element control circuit controls on/off operation of the first switching element and the second switching element so that the first switching element is turned off and the second switching element is turned on in response to the first switching-time control signal, and the second switching element is turned off and the first switching element is turned on in response to the second switching-time control signal. The reset-release timing is designated as a starting point for counting the first time period and a second time period that is longer than the first time period, and the switching-time control circuit generates reset signals when the second time period has elapsed from the reset-release timing.

In another aspect of this disclosure, there is a provided novel electronic device including the above-described switching regulator.

BRIEF DESCRIPTION OF THE DRAWINGS

The aforementioned and other aspects, features and advantages are better understood by reference to the following detailed description when considered in connection with the accompanying drawings, wherein.

DETAILED DESCRIPTION OF PREFERRED EMBODIMENTS

Figure 1:
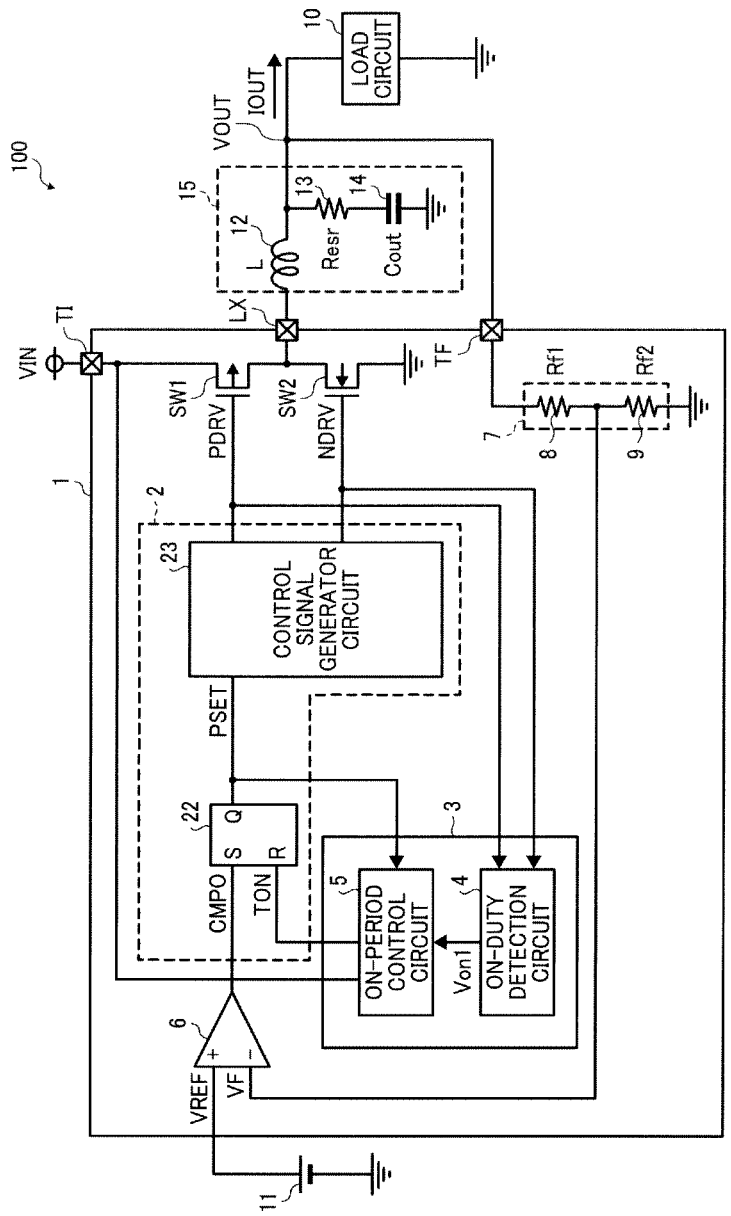
FIG. 1 is a circuit diagram illustrating a configuration of a switching regulator according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIGS. 1 through 5, a switching regulator according to an illustrative embodiment is described.

First Embodiment

Figure 2:
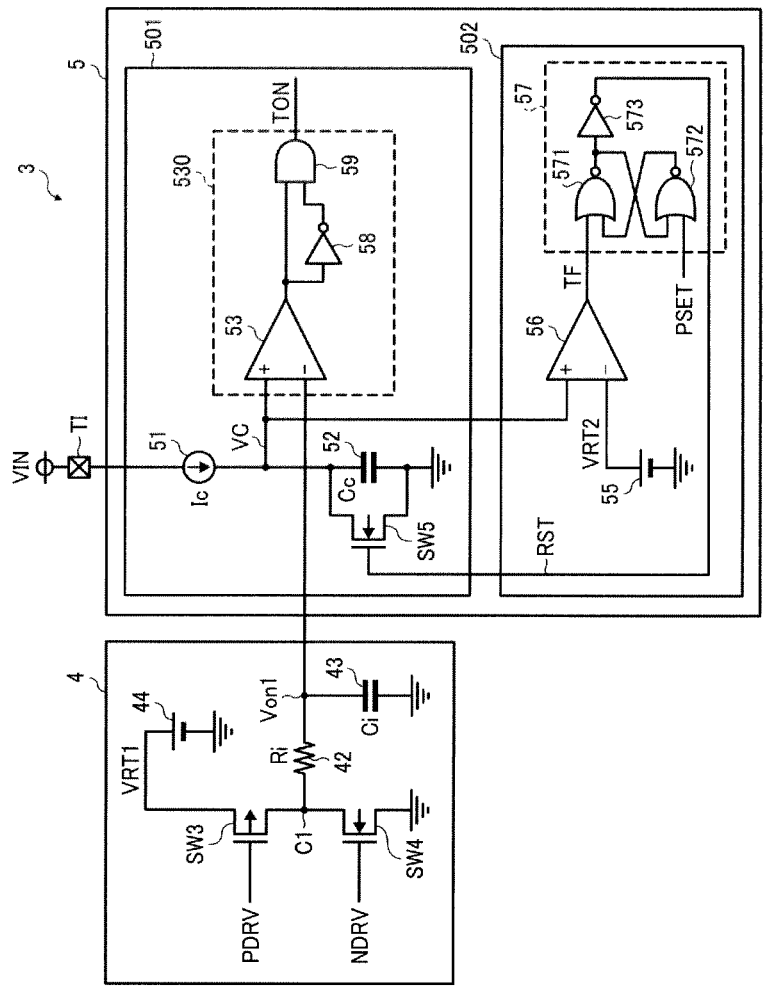
FIG. 2 is a circuit diagram illustrating a configuration of a switching-time control circuit in the switching regulator shown in FIG. 1.
Figure 3:
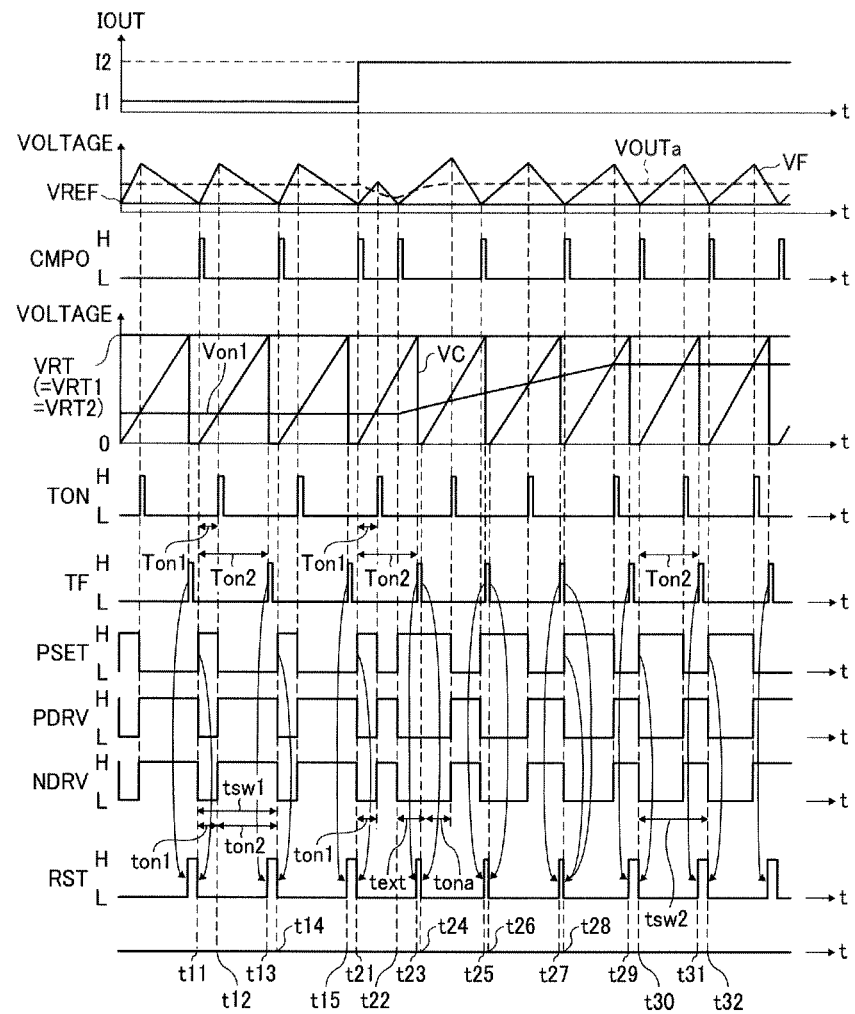
FIG. 3 is a timing chart illustrating operation in the switching regulator shown in FIG. 1.

FIG. 1 is a circuit diagram illustrating the configuration of a switching regulator 1 according to a first embodiment. FIG. 2 is a circuit diagram illustrating the configuration of a switching-time control circuit 3 of the switching regulator 1. FIG. 3 is a timing chart illustrating operation in the switching regulator 1 shown in FIG. 1.

The switching regulator 1 of the present disclosure is installed in, for example, electronic devices 100 such as personal computers, and is used for supplying direct current to a load circuit 10 (e.g., a CPU, etc.).

In FIG. 1, the switching regulator 1 includes a switching-element control circuit 2, the switching-time control circuit 3, a comparator 6, switching elements SW1 and SW2, a dividing circuit 7 including a dividing resistor 8 having resistance Rf1 and a dividing resistor 9 having resistance Rf2, an input terminal TI to which an input voltage VIN is input, an output terminal LX, and a feedback terminal TF. The switching regulator 1 may be employed in an electronic device 100. The switching-element control circuit 2 includes a RS flip-flop circuit 22 and a control-signal generator circuit 23. In addition, the switching-time control circuit 3 includes an ON-duty detection circuit 4 and an ON-period control circuit 5.

In FIG. 2, the ON-duty detection circuit 4 includes an inverter 41, switching elements SW3 and SW4, a reference voltage source 44 that outputs a predetermined reference voltage VRT, an integral resistive element 42 having a resistance Ri, and a capacitor 43 having a capacitance Ci.

In FIG. 2, the ON-period control circuit 5 includes a switching time control-signal generator circuit 501 and a reset circuit 502. The switching time control-signal generator circuit 501 includes a reference current source 51 to output a predetermined reference current Ic, a capacitor 52 having a capacitance Cc, a switching element SW5, a comparator 53, an inverter 58, and an AND gate 59. Herein, the comparator 53, the inverter 58, and the AND gate 59 together form a comparator circuit 530.

In addition, the reset circuit 502 includes a reference voltage source 55 to output a predetermined reference voltage VRT2, a comparator 56, and a latch circuit 57. The latch circuit 57 includes NOR gates 571 and 572 and an invert 573.

The switching regulator 1 converts the input voltage VIN into a predetermined output voltage VOUT. The input voltage VIN is input to the input terminal TI. The output terminal LX outputs the output voltage VOUT. The first switching element SW1 is connected between the input terminal TI and the output terminal LX. The second switching element SW2 is connected between the output terminal TI and ground GND. The switching-time control circuit 3 generates a first switching-time control signal (first signal) TON indicating finish timing of an ON-period "ton1" of the first switching element SW1 when a first time period Ton1, corresponding to a ratio of a length of the ON-period "ton1" of the first switching element SW1 to a sum of lengths of ON-periods "ton1+ton2" of the first switching element SW1 and the second switching element SW2, has elapsed from respective reset-release timings. By designating the reset-release timing as a start point for the first time period Ton1 and a second period time period Ton2 that is longer than the first time period Ton1, the switching-time control circuit 3 generates reset signals (high-level reset signal) RST when the second time period Ton2 has elapsed from the reset release timings. The first comparator 6 compares a feedback voltage VF corresponding to the output voltage VOUT with a predetermined reference voltage (first reference voltage) VREF, and generates a second switching-time control signal (second signal) CMPO indicating finish timing of the ON-period "ton2" of the second switching element SW2 when the feedback voltage VF is smaller than the first reference voltage VREF. The switching-element control circuit 2 controls on/off operation of the first switching element SW1 and the second switching element SW2 so that the first switching element SW1 is turned off and the second switching element SW2 is turned on in response to the first switching-time control signal TON, and the second switching element SW2 is turned off and the first switching element SW1 is turned on in response to the second switching-time control signal CMPO.

Herein, when the first time period Ton1 has elapsed (e.g., t12 shown in FIG. 3) from a reset-release timing (t11), the switching-time control circuit 3 generates the first switching-time control signal TON. When the second time period Ton2 has elapsed from the reset release timing (e.g., t11, t30), the switching-time control circuit 3 generates a reset signal (high-level reset signal) RST at reset timing (t13, t31).

Then, when the switching-time control circuit 3 detects that the predetermined second time period Ton2 has elapsed (e.g., timing t13, t31 shown in FIG. 3) from the reset-release timing (e.g., timing t11, t30) and the second switching element SW2 is turned off (when the switching-time control circuit 3 detects that the second switching element SW2 is turned off after the high-level reset signal (reset signal) RST is generated), the switching-time control circuit 3 generates a low-level reset signal (reset-release signal) RST at the reset-release timings (e.g., t14, t32) to switch the first switching element SW1 on.

Alternatively, when the switching-time control circuit 3 detects that the second switching element SW2 is turned off (e.g., timing t22 shown in FIG. 3) before the predetermined second time period Ton2 has elapsed from the reset-release timing (e.g., t21), the switching-time control circuit 3 switches the first switching element SW1 on without generating the reset signal (high-level reset signal) RST. Then, when the second time period Ton2 has elapsed (e.g., t23) from the reset-release timing (t21), the switching-time control circuit 3 generates the high-level reset signal RST indicating a subsequent reset timing (123) without switching the switching elements SW1 and SW2.

As noted above, the switching-time control circuit 3 includes the ON-duty detection circuit 4, the switching-time control-signal generator circuit 501, and the reset circuit 502. The switching-time control-signal generator circuit 501 and the reset circuit 502 constitute the ON-period control circuit 5. The ON-duty detection circuit 4 outputs a detected voltage Von1 indicating the ratio of the length of the ON-period "ton1" of the first switching element SW1 to the sum of the lengths of the ON-periods "ton1+ton2" of the first switching element SW1 and the second switching element SW2. The ON-period control circuit 5 generates the first switching-time control signal TON based on the detected voltage Von1. The reset circuit 502 generates the reset signal RST representing the reset timing and the reset-release timing.

The ON-duty detection circuit 4 includes the reference voltage source (first reference voltage source) 44, the switching element (third switching element) SW3, the switching element (fourth switching element) SW4, the integral resistive element 42, and the capacitor (first capacitance element) 43. The first reference voltage source 44 generates a predetermined reference voltage (second reference voltage) VRT1. The third switching element SW3 has one terminal connected to the first reference voltage source 44, controlled so that the third switching element SW3 is turned on and off in conjunction with the first switching element SW1. The fourth switching element SW4 has one terminal connected between the other terminal of the third switching element SW3 and the ground, controlled so that the fourth switching element SW4 is turned on and off in conjunction with the second switching element SW2. The integral resistive element 42 has one terminal connected to a junction node C1 between the third switching element SW3 and the fourth switching element SW4. The first capacitance element 43 is connected between the other terminal of the integral resistive element 42 and the ground. The ON-duty detection circuit 4 outputs a voltage across the first capacitance element 43 as the detected voltage Von1.

The switching-time control-signal generator circuit 501 includes the reference current source 51, the capacitor (second capacitive element) 52, the switching element (fifth switching element) SW5, and the comparator circuit 530. The reference current source 51 outputs a predetermined reference current Ic. The second capacitive element 52 is connected between the reference current source 51 and the ground. The fifth switching element SW5 is connected in parallel to the second capacitive element 52, controlled so that the fifth switching element SW5 is turned on at the reset-release timing when the reset signal RST changes from high to low and is turned off at the reset timings when reset signals RST changes from low to high. The comparator circuit 530 compares the detected voltage Von1 from the ON-duty detection circuit 4 with a voltage VC across the second capacitive element 52, and outputs the first switching-time control signal TON at a timing which the voltage VC across the second capacitive element 52 is greater than the detected voltage Von1.

Further, the reset circuit 502 includes the reference source (second reference source) 55, the comparator (second comparator) 56, and the latch circuit 57. The second reference source 55 generates a predetermined reference voltage (third reference voltage) VRT2 that is greater than the second reference voltage VRT1. The second comparator 56 compares the voltage VC across the second capacitive element 52 of the switching-time control-signal generator circuit 501 with the third reference voltage VRT2 and outputs an output signal TF indicating the comparison result. The latch circuit 57 detects that the second time period Ton2 has elapsed from the reset-release timing based on the output signal TF from the second comparator 56, and detects that the second switching element SW2 is turned off based on a predetermined signal PSET, from the switching-element control circuit 2, indicating a timing that the second switching element SW2 is turned off, to control the reset signal RST to represent the reset timing and the reset-release timing.

More specifically, the comparator 56 outputs a high-level output signal TF while the voltage VC across the second capacitive element 52 is greater than the third reference voltage VRT2, and outputs a low-level output signal TF while the voltage VC is smaller than the third reference voltage VRT2. When the output signal TF from the second comparator 56 is changed from low to high and the latch circuit 57 detects that the second time period Ton2 has elapsed from the respective reset-release timings, the latch circuit 57 generates the high-level reset signal RST to switch the fifth switching element SW5 of the switching-time control-signal generator circuit 501 off, regardless of the state of the predetermined control signal PSET (state of the switching element SW2).

In addition, while the output signal TF from the second comparator 56 is low and when the predetermined control signal PSET from the switching-element control circuit 2 is changing from low to high as the second switching element SW2 is switched from on to off, the latch circuit 57 changes the reset signal RST from high to low at the reset-release timing, timed to coincide with switching of the second switching element SW2 from on to off to switch the fifth switching element SW5 of the switching-time control-signal generator circuit 501 from off to on.

Alternatively, while the predetermined control signal PSET from the switching-element control circuit 2 is high and when the output signal TF from the second comparator 56 is changing from high to low, the latch circuit 57 changes the reset signal RST from high to low at the reset-release timing, timed to coincide with switching of the output signal TF from high to low, to switch the fifth switching element SW5 of the switching-time control-signal generator circuit 501 from off to on.

Referring back to FIG. 1, the first switching element SW1 is connected between the input terminal TI and the output terminal LX, and the second switching element SW2 is connected between the output terminal LX and the ground. The output voltage from the output terminal LX is output to the load circuit 10 (e.g., CPU) via a high-frequency removal and smoothing low-pass filter 15 constituted by an inductor 12 having an inductance L and an output capacitor 14 having a capacitance Cout. A resistor 13 that has a resistance Resr is a serial equivalent parasitic resistor to the output capacitor 14.

The output voltage VOUT from the low-pass filter 15 is input to the switching regulator 1 via a feedback terminal TF and then is divided by a second dividing circuit 7. Then, a feedback voltage VF after dividing is proportional to the output voltage VOUT and is output to an inverting input terminal (−) of the comparator 6. The predetermined reference voltage reference voltage) VREF generated in a reference voltage source 11 is input to a non-inverting input terminal (+) of the comparator 6.

The comparator 6 compares the feedback voltage VF with the reference voltage VREF. Then, the comparator 6 outputs a low-level switching-time control signal CMPO to a set terminal S of the RS flip-flop circuit 22 when the feedback voltage VF is greater than the reference voltage VREF. Conversely, the comparator 6 outputs a high-level switching-time control signal CMPO to the set terminal S of the RS flip-flop circuit 22 when the feedback voltage VF is smaller than the reference voltage VREF.

The high-level switching-time control signal CMPO serves as a second switching-time control signal. The second switching-time control signal CMPO from the comparator 6 indicates the finishing timing of the ON-period "ton2" of the switching element SW2.

In addition, the switching-time control circuit 3 outputs the first switching-time control signal TON (high-level switching time control signal TON) indicating the finish timing of the ON-period ton1 of the switching element SW1 to a reset terminal R of the RS flip-flop circuit 22, which are described further detail later.

The output signal PSET from the RS flip-flop circuit 22 is output to the control-signal generator circuit 23. The control-signal generator circuit 23 generates a first switching-element control signal PDRV to control on and off of the switching element SW1 for output to a gate of the switching element SW1 and a second switching-element control signal NDRV to control on and off of the switching element SW2 for output to a gate of the switching element SW2. The control-signal generator circuit 23 controls the switching elements SW1 and SW2 so that the ON-period ton1 of the switching element SW1 is finished when the output signal PSET falls and the ON-period ton2 of the switching element SW2 is finished when the output signal PSET rises, and the switching elements SW1 and SW2 are complementarily turned on.

In addition, the control-signal generator circuit 23 outputs the switching-element control signals PDRV and the NDRV to gate terminals of the switching elements SW3 and SW4 in the ON-duty detection circuit 4 (see FIG. 2).

In the present embodiment, the switching element SW1 is turned on in response to the low-level switching-element control signal PDRV and is turned off in response to the high-level switching-element control signal PDRV. By contrast, the switching element SW2 is turned on in response to the high-level switching-element control signal NDRV and is turned off in response to the low-level switching-element control signal NDRV.

In addition, the switching-element control signal PDRV and NDRV are generated to so that the switching element SW2 is turned on when the switching element SW1 is turned off, and the switching element SW1 is turned on when the switching element SW2 is turned off.

In FIG. 1, when the feedback voltage VF becomes smaller than the reference voltage VREF, the comparator 6 switches the voltage level of the switching-time control signal CMPO from low to high. In response to this operation, the RS flip-flop circuit 22 is set, and the voltage level of the output signal PSET in the RS flip-flop circuit 22 becomes high. At this time, the control-signal generator circuit 23 generates the switching-element control signals PDRV and NDRV so that the switching element SW1 is turned on and the switching element SW2 is turned off. In response to this operation, the switching element SW1 is turned on and the switching element SW2 is turned off, and as a result, energy is stored in the inductor 12 by a voltage difference between the input voltage VIN and the output voltage VOUT. Accordingly, as an inductance current in the inductor 12 is increased, the output voltage VOUT is increased by the output capacitor 14 and the serial parasitic resistor 13.

Then, when the voltage level of the switching-time control signal TON switches from low level to high level, in response to this operation, the RS flip-flop circuit 22 resets, and the voltage level of the output signal PSET from the RS flip-flop circuit 22 becomes low. At this time, the control-signal generator circuit 23 generates the switching-element control signals PDRV and NDRV so that the switching element SW1 is turned off and the switching element SW2 is turned on. In response this operation, the switching element SW1 is turned off and the switching element SW2 is turned on, and the energy in the inductor 12 is released by a voltage difference between the ground voltage and the output voltage VOUT. Accordingly, as the inductance current in the inductor 12 is decreased, the output voltage VOUT is decreased by the output capacitor 14 and the serial parasitic resistor 13.

With reference to FIG. 2, in the ON-duty detection circuit 4, the third switching element. SW3 is connected between the reference voltage source 44 and a junction node C1, and the switching element SW4 is connected between the junction node C1 and the ground. The integral resistor 42 having one terminal connected to the junction node C1, and the capacitor 43 is connected between the other terminal of the integral resistor 42 and the ground. A voltage at the junction node C1 that is a voltage across the capacitor 43 is output to an inverting input terminal (−) of the comparator 53 as a detected voltage Von1. Herein, the integral resistor 42 and the capacitor 43 constitute an integral circuit.

In the switching-element control circuit 2 shown in FIG. 2, the switching-element control signal PDRV is output to a gate terminal of the switching elements SW3, and the switching-element control signal NDRV is output to a gate terminal of the switching elements SW4. By inputting the switching-element control signals PDRV and NDRV, the switching element SW3 is turned on during the ON-period "ton1" of the switching element SW1, in conjunction with the switching element SW1, and the switching element SW4 is turned on during the ON-period "ton2" of the switching element SW2, in conjunction with the switching element SW2.

In FIG. 2, while the switching element SW1 is on and the switching element SW2 is off, the switching element SW3 is on and the switching element SW4 is off. In this state, the reference voltage source 44 is connected to the integral resistor 42 via the switching element SW3, and the capacitor 43 is charged to the reference voltage VRT via the switching element SW3 and the integral resistor 42.

By contrast, while the switching element SW1 is off and the switching element SW2 is off on, the switching element SW3 is off and the switching element SW4 is on. In this state, one terminal of the integral resistor 42 is connected to the ground via the switching element SW4, and the capacitor 43 is discharged to the ground voltage via the integral resistor 42 and the switching element SW4.

In FIG. 2, a charge Qchq, charged in the capacitor 43 in a period during which the lament SW3 is on state and the switching element SW4 is off state, that is, a time period during which the switching element SW1 is on state, is calculated by the following formula 7, using a length of the ON-period "ton1" during which the switching element SW1 is on state, the reference voltage VRT1, and a voltage V(t) (t: time) at a junction node between the integral resistor 42 and the capacitor 43.

$$Qchg = \int_0^{ton1} \frac{VRT1 - V(t)}{Ri} dt \qquad (7)$$

In addition, a charge Qdchg, charged in the capacitor 43 in a period during which the switching element SW3 is off state and the switching element SW4 is off slate, that is, a period during which the switching element SW2 is turned on, is calculated by the following formula 8, using a length of the ON-period "ton2" during which the switching element SW2 is on state.

$$Qdchg = \int_0^{ton2} \frac{V(t)}{Ri} dt \qquad (8)$$

At this time, the switching elements SW3 and SW4 repeat turning on and off, and after a time period Te (Te>>Ri×Ci) (Ri: resistance of the integral resistor 42, Ci: capacitance of the capacitor 43) has elapsed, the voltage V(t) converges at a constant voltage Von1. Therefore, the voltage V(t) is approximated with the voltage Von (V(t)≈Von1), thereby deforming the formulas 7 and 8 as follows:

$$Qchg \approx ton1 \times \frac{VRT1 - Von1}{Ri} \qquad (9)$$

$$Qdchg \approx ton2 \times \frac{Von1}{Ri} \qquad (10)$$

In addition, after the time period Te (Te>>Ri×Ci) has further elapsed, the charge Qchg becomes equal to the charge Qdchg (Qchg=Qdchg), and therefore, the output voltage (detected voltage) Von1 from the ON-duty detection circuit 4 is represented by the following formula 11, based on the formulas 9 and 10.

$$Von1 = \frac{ton1}{ton1 + ton2} \times VRT1 \qquad (11)$$

That is, the ON-duty detection circuit 4 generates the detected voltage Von1 proportional to an ON-duty (ton1/

(ton1+ton2)) of the switching element SW1 for output to the inverting input terminal (−) of the comparator 53.

In the switching-time control-signal generator circuit 501 shown in FIG. 2, the reference current source 51 has one terminal connected to the input terminal TI, and the capacitor 52 is connected between the reference current source 51 and the ground. The switching element SW5 is connected in parallel to the capacitor 52. The voltage VC at a junction node between the reference current source 51 and the capacitor 52 (the voltage VC is a voltage across the capacitor 52) is output to a non-inverting input terminal (+) of the comparator 53 and a non-inverting input terminal (+) of the comparator 56. The comparator 53 outputs an output signal to a first input terminal of the AND gate 59 and the inverter 58. The inverter 58 inverts and delays the output signal for output to a second input terminal of the AND gate 59. Then, the AND gate 59 generates the switching-time control signal TON for output to a reset terminal R of the RS flip-flop circuit 22.

In FIG. 2, the switching element SW5 is switched off in response to the low-level reset signal RST from the latch circuit 57. When the switching element SW5 is switched off, the capacitor 52 is charged at the reference current Ic. In addition, the switching element SW5 is switched on in response to the high-level reset signal RST. When the switching element SW5 is switched on, the charge charged in the capacitor 52 is fully discharged.

Further, the comparator 53 compares the voltage VC across the capacitor 52 with the detected voltage Von1. When the voltage VC is greater than the detected voltage Von1, the comparator 53 generates a high-level output signal. When the voltage VC is smaller than the detected voltage Von1, the comparator 53 outputs a low-level output signal.

With this configuration, while the voltage VC across the capacitor 52 is smaller than the detected voltage Von1, the comparator circuit 530 generates the low-level switching-time control signal TON. When the voltage VC across the capacitor 52 is exceeding the detected voltage Von1, the comparator circuit 530 generates the high-level switching-time control signal TON for a short period having a pulse width equal to a delay time of the inverter 58. Herein, the switching-time control signal TON of pulse signal indicates a finish timing of the ON-period ton1 of the switching element SW1.

In the reset circuit 502 shown in FIG. 2, the comparator 56 compares the voltage VC across the capacitor 52 with the reference voltage VRT2 (from the reference voltage generator 55). While the voltage VC is greater than the reference voltage VRT2, the comparator 56 generates a high-level output signal TF. While the voltage VC is smaller than the reference voltage VRT2, the comparator 56 generates a low-level output signal TF. The output signal TF from the comparator 56 is output to a first input terminal of the NOR gate 571.

The output signal PSET from the RS flip-flop circuit 22 of the switching-element control circuit 2 is input to a first input terminal of the NOR gate 572. An output signal from the NOR gate 571 is output to a second input terminal of the NOR gate 572 and the inverter 573. An output signal from the NOR gate 572 is input to a second input terminal of the NOR gate 571. The inverter 573 inverts the output signal from the NOR gate 571 for output to a gate terminal of the switching element SW5 as the reset signal RST.

Accordingly, the latch circuit 57 generates the reset signal RST, based on the output signal TF from the comparator 56 and the output signal PSET from the RS flip-flop circuit 22, as follows.

In FIG. 2, the capacitor 52 of the switching-time control-signal generator circuit 501 is charged at the reference current Ic. Then, when the voltage VC across the capacitor 52 exceeds the reference voltage VRT2, the comparator 56 switches the voltage level of the output signal TF from low level to high level, and accordingly, the latch circuit 57 switches the voltage level of the reset signal RST from low to high at the reset timing (t13, t15, t23, t25, t27, t29, t31 shown in FIG. 3). In response to this operation, the switching element SW5 is switched on, the capacitor 52 is discharged to the ground, the voltage VC falls below the reference voltage VRT, and the comparator 56 turns the voltage level of the output signal TF from high to low.

In a state in which the switching element SW2 is off and the voltage level of the output signal PSET is high when the voltage level of the output signal TF switches from high to low, the latch circuit 57 switches the voltage level of the reset signal RST from high to low timed to coincide with the switching of the output signal TF from high to low at the reset-release timings (t24, t26). In response to this operation, the switching element SW5 is turned off, and the capacitor 52 is charged again (see FIG. 3.)

Conversely, in a state in which the voltage level of the output signal PSET from the RS flip-flop circuit 22 is low when the voltage level of the output signal TF is changing from high to low, the voltage level of the reset signal RST switches from high to low, timed to coincide with the switching of the output signal PSET from low to high (timed to coincide with the switching of the switching element SW2 from on to off) at the reset-release timings (t11, t14, t28, t30, t32). In response to this operation, the switching element SW5 is turned off, and the capacitor 52 is charged again. (see FIG. 3)

Next, a switching frequency "fsw" of the switching regulator 1 is described below. In FIG. 2, when the switching element SW1 is switched from on to off in response to generating the (high-level) switching-time control pulse signal TON, the value of the voltage VC across the capacitor 52 is represented by following formula, using the length of ON-period (ON-time) ton1 of the switching element SW1.

$$VC = Ic \times \frac{ton1}{Cc} \qquad (12)$$

Accordingly, when the switching element SW1 is being switched on to off, the following formulas 11 and 12 hold, $$\frac{ton1}{ton1 + ton2} \times VRT1 = Ic \times \frac{ton1}{Cc} \qquad (13)$$

Therefore, the formula 14 can be obtained.

$$ton1 + ton2 = \frac{Cc}{Ic} \times VRT1 \qquad (14)$$

Therefore, the switching frequency fsw can be calculated as below.

$$fsw = \frac{1}{ton1 + ton2} \qquad (15)$$
$$= \frac{Ic}{Cc \times VRT1}$$

In formula 15, the switching frequency fsw is a constant determined by element values of the elements constituting the ON-duty detection circuit 4 and the switching-time control-signal generator circuit 501. Accordingly, in the present embodiment, the switching frequency fsw is a constant without depending on the input voltage VIN, the output voltage VOUT, and the output current Iout.

Next, the setting way to set the reference voltages VRT1 and VRT2 is described below.

The reference voltages VRT1 and VRT2 are set so that the first reference voltage VRT1 is equal to or smaller than the second reference voltage VRT2 (VRT1<VRT2). Since the voltage Von is smaller than the first reference voltage VRT1 (Von1<VRT1), the voltage Von is smaller than the second reference voltage VRT2 (Von1<VRT2).

Accordingly, while the voltage level of the output signal from the comparator 53 is low, the voltage level of the output signal TF from the comparator 56 is always low level. That is, a time period Ton1 from when the switching element SW5 is switched from on to off and the charging of the capacitor 52 is started, to when the voltage level of the output signal from the comparator 53 is turned from low to high, becomes shorter than the time period Ton2 from when the switching element SW5 is switched from on to off and the charging of the capacitor 52 is started, to when the voltage level of the output signal TF from the comparator 56 is turned from low to high (Ton1<Ton2, see FIG. 3)

Herein, the lime period Ton2 is represented by following formula 16.

$$Ton2 = VRT2 \times \frac{Cc}{Ic} \quad (16)$$

Accordingly, the following formula 17 can be obtained based on formulas 14 and 16.

$$to1 + ton2 = Ton2 \times \frac{VRT1}{VRT2} \quad (17)$$

In addition, when the reference voltages VRT1 and VRT2 are set so that the first reference voltage VRT1 is equal to the second reference voltage VRT2, the formula 17 can be deformed as below.

$$ton1+ton2=Ton2 \quad (18)$$

Accordingly, by setting the reference voltages VRT1 and VRT2 so that the first reference voltage VRT1 is equal to the second reference voltage VRT2, the time period Ton2 is equal to a switching cycle tsw (tsw=1/fsw) (Ton2=tsw) in theory. However, a reset period during which the reset signal RST is high has a certain time period in actuality, and therefore, the switching cycle tsw corresponds to a period of the sum of the second time period Ton2 and the reset period, as illustrated in FIG. 3.

FIG. 3 is a timing chart illustrating operation of the switching regulator 1 when the output current IOUT is precipitously increased from the first current to the second current (I1<I2) at a timing t21. In FIG. 3, the reference voltages VRT1 and VRT2 are set to the same reference voltage value VRT. (VRT1=VRT2=VRT) The reset-release timings (e.g., t11, t14, t21, t24, t26, t28, t30, and t32 shown in FIG. 3) are the timings when the reset signal RST changes from high to low, and when charging the capacitor 52 is started. The reset timings (e.g., t13, t15, t23, t25, t27, t29, and t31 shown in FIG. 3) are the timings when the reset signal RST changes from low to high, and when the capacitor 52 is discharged.

As illustrated in FIG. 3, when the time period Ton1 corresponding to the detected voltage Von1 has elapsed (e.g., timing 112) from the reset-release timing (t11), the switching-time control pulse signal TON switches from low to high (first switching-time control signal is generated).

When detecting that the time period Ton2, that is longer than the time period Ton1, has elapsed (113) from the reset-release timing t11, based on the output signal TF from he comparator 56, the latch circuit 57 generates the high-level reset signal RST to switch the switching element SW5 from off to on.

Then, when the latch circuit 57 detects hat the time period Ton2 has elapsed from the reset-release timing t11 and then the switching element SW2 is switched off based on rising timing of the output signal PSET from the RS flip-flop circuit 22, the latch circuit 57 generates the low-level reset signal RST indicating a subsequent reset-release timing t14 following to the former reset-release timing t11.

In FIG. 3, when the output current IOUT is increased from the first current I1 to the second current I2, the ratio of the length of the ON-period ton1 of the switching element SW1 relative to length of the ON-period ton2 of the switching element SW2 is changed. However, the detected voltage Von1 is increased depending on the formula 11 and accordingly the length of ON-period ton1 of the switching element SW1 is increased. Therefore, a switching cycle tsw1 when the output current IOUT is the first current I1 becomes equal to a switching cycle tsw2 when the output current IOUT is the second current I2, and the switching frequency fsw does not change.

In addition, as is clear from FIG. 3, even though the output current IOUT is increased from the first current I1 to the second current I2, the time-averaged voltage VOUTa does not change. As is confirmed in the formula 14, even though the input voltage VIN and the output current IOUT are changed, the switching frequency fsw and the time-averaged voltage VOUTa of the output voltage VOUT do not change.

In FIG. 3, as the output current IOUT is precipitously increased at the reset-release timing t21, the output voltage VOUT is decreased. Then, when the time period Ton1 corresponding to the detected voltage Von1 has elapsed from the rest-release timing t21, the switching-time control pulse signal TON changes from low to high (first switching-time control signal is generated). In response to generation of the first switching-time control TON, the switching element SW1 is switched off and the ON-time (length of ON-period) ton1 of the switching element SW1 is determined. As the switching element SW1 is switched off, the switching element SW2 is switched off. Herein, as the output current IOUT is precipitously increased at the reset t21, the output voltage VOUT is decreased. Therefore, at the timing t22, the feedback voltage VF falls below the first reference voltage VREF before the voltage VC across the capacitor 52 reaches the second reference voltage VRT. In response to this operation, the switching element SW2 is switched off and the switching element S1 is switched on again (t22).

Then, when the time period Ton2 has elapsed (t23) from the reset-release timing t21, the voltage VC across the capacitor 52 reaches the third reference voltage VRT2, and the comparator 56 switches the voltage level of the output signal TF from low to high. As the output signal TF is switched from low to high, the latch circuit 57 generates the high-level reset signal RST (t23), and the switching element SW5 is switched on and the capacitor 52 is discharged to the ground voltage.

Then, the voltage level of the output signal TF from the comparator 56 is changed from high to low (t24). At this time (t24), while the voltage level of the output signal PSET from the RS flip-flop circuit 22 is high level, the reset signal RST changes from high to low (e.g., t24, t26), timed to coincide with the switching of the output signal TF from high to low. In response to this operation, the switching element SW5 is switched off again and the charge of the capacitor 52 is restarted. Then, when the voltage VC exceeds the detected voltage Von1 after a time period "tona", corresponding to the detected voltage Von1 has elapsed from the reset-release timing t24, in response to this operation, the pulse-shaped first switching-time control signal TON is generated, and the switching element SW1 is turned off and the switching element SW2 is switched on.

Herein, a time period from the timing t22 at which the switching element SW2 is turned off to the next reset timing 123 is determined as a time period "text".

As described above, when the time period Ton1 corresponding to the detected voltage Von1 has elapsed from the reset-release timing t21, the latch circuit 57 generates the switching-time control signal TON. When the switching element SW2 is switched off (e.g., t22) before the time period Ton2 has elapsed (t23) from the reset-release timing t21, (timing t22 at which the output signal PSET from the RS flip-flop rises), the switching element SW1 is switched on without generating the high-level reset signal RST. Then, when the time period Ton2 has elapsed from the reset-release timing, the latch circuit 57 generates the high-level reset signal RST representing a subsequent reset timing t23 following to the reset release timing t21.

Accordingly, as illustrated in FIG. 3, when the output current IOUT is precipitously changed at the reset-release timing t21, a length of ON-period of the switching element SW1 is extended from the length of ON-time "ton1" in the normal state to the length of ON-period (text+tona), which moderates the decrease in the time-averaged voltage VOUTa of the output voltage VOUT.

As described above, in the present embodiment, without increasing the chip size and consumption of the current, the switching frequency fsw and the time-averaged voltage VOUTa of the output voltage VOUT can be kept constant, and accordingly, the switching regulator 1 can supply a voltage with a high degree of accuracy to the load circuit 10.

More particularly, even when the output current IOUT is precipitously changed, the switching frequency fsw and the time-averaged voltage VOUTa of the output voltage VOUT can be kept constant.

Second Embodiment

Figure 4:
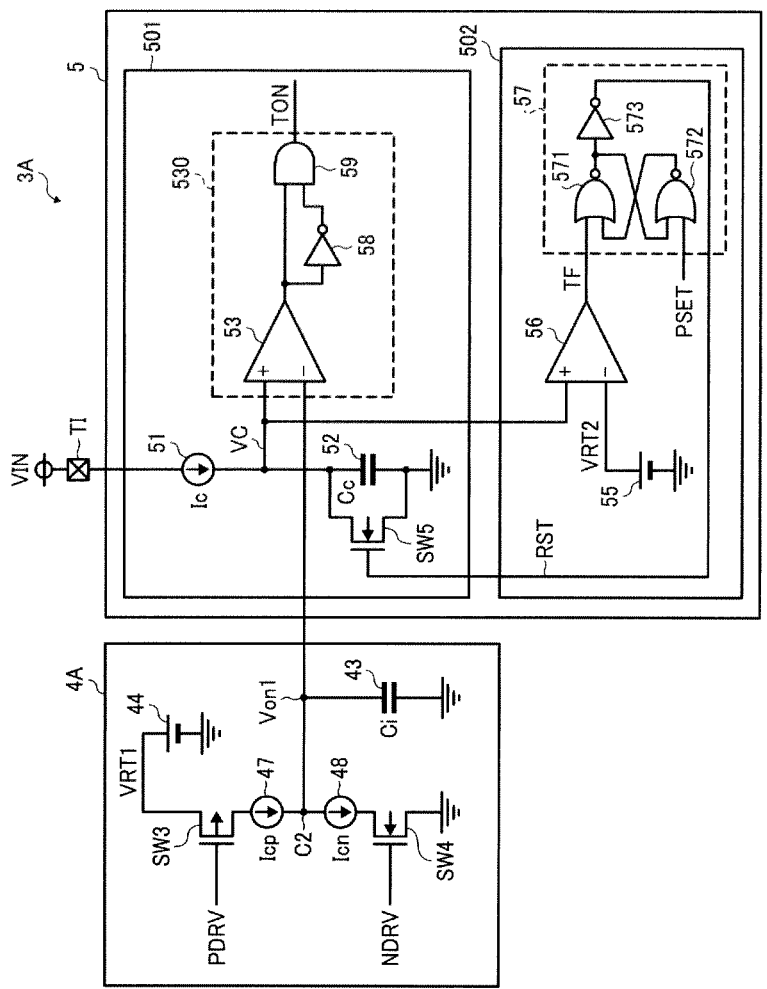
FIG. 4 is a circuit diagram illustrating a configuration of a switching regulator according to a second embodiment.

FIG. 4 is a circuit diagram illustrating a configuration of a switching-time control circuit 3A according to a second embodiment. In the second embodiment, the switching-time control circuit 3A includes an ON-duty detection circuit 4A instead of the ON-duty detection circuit 4 in the switching-time control circuit 3 in the first embodiment.

The ON-duty detection circuit 4A includes a reference voltage source 44, a switching element SW3, a switching element SW4, a charge reference current source 47, a discharge-reference current source 48, and a capacitor 43. The reference voltage 44 generates a reference voltage VRT. The switching element SW3 has a one terminal connected to the reference voltage source 44 and is turned on and off in conjunction with the switching element SW1. The charge-reference current source 47 is connected to the other terminal of the switching element SW3 and outputs a charge reference current Icp. The switching element SW4 has a one terminal connected to the ground and is turned on and off in conjunction with the switching element SW2. The discharge-reference current source 48 is connected to the other terminal of the switching element SW3 and outputs a charge reference current Icp.

The switching element SW3, the charge-reference current source 47, the discharge-reference current source 48, the switching element SW4 are connected between the reference voltage source 44 and the ground voltage. A junction node C2 between the reference current sources 47 and 48 is connected to the ground via the capacitor 43.

Further, the voltage across the capacitor 43 is output to an inverting input terminal (−) of the comparator 53, as a detected voltage Von1.

Similarly to the first embodiment, in FIG. 4, the switching-element control signals PDRV and NDRV from the control-signal generator circuit 23 are output to gates of the switching elements SW3 and SW4, respectively.

In response this operation, the switching element SW3 is turned on in conjunction with the switching element SW1 while the switching element SW1 is on. The switching element SW4 is turned on in conjunction with the switching element SW2 while the switching element SW2 is on.

In FIG. 4, while the switching element SW1 is on and the switching element SW2 is off, the output signal PSET from the RS flip-flop circuit 22 is high level, and therefore, the switching element SW3 is off and the switching element SW4 is on. Therefore, the reference voltage source 44 is connected to the charge-reference current source 47 via the switching element SW3, the capacitor 43 is charged at the charging current Icp.

Conversely, while the switching element SW1 is off and the switching element SW2 is on, the output signal PSET from the RS flip-flop circuit 22 is low level, and therefore, the switching element SW3 is off and the switching element SW4 is on. Therefore, one terminal of the capacitor 43 is connected to the ground via the discharge reference current source 48 and the switching element SW4, and the capacitor 43 is discharged to the ground voltage at the discharge current Icn.

By repeating switching on and off of the switching elements SW3 and SW4, a time Te (Te>>Ri×Ci) has elapsed, similarly to the first embodiment, the detected voltage Von1 (see formula 11) proportional to the on duty (ton1/(ton1+ton2)) of the switching element SW1 is generated.

In general, the switching regulator includes a reference current source t drive the circuit, which can be used as the reference current sources 47 and 48. Therefore, circuit area of the ON-duty detection circuit 4A in the present embodiment can be further smaller than that of the on-duty detection circuit 4. In addition, the charging current Icp when the switching element SW3 is on state and the discharge current Icn when the switching element SW4 is on state are set separately, the level of the detected voltage Von1 can be set at arbitral.

Therefore, as the level of the detected voltage Von1 is set smaller, the input voltage of the comparator 53 becomes smaller. Thus, the comparator 53 in the present embodiment can become smaller circuit area and set lower consumption current.

Third Embodiment

Figure 5:
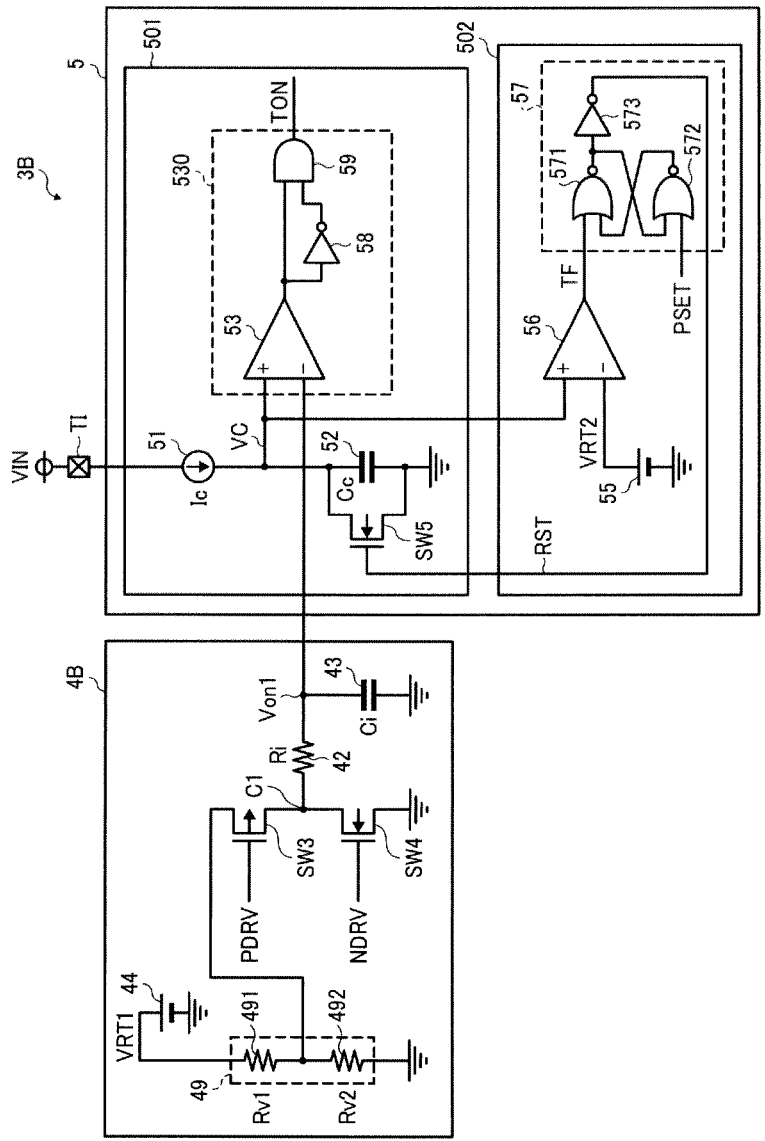
FIG. 5 is a circuit diagram illustrating a switching-time control circuit according to a third embodiment.
Figure 6:
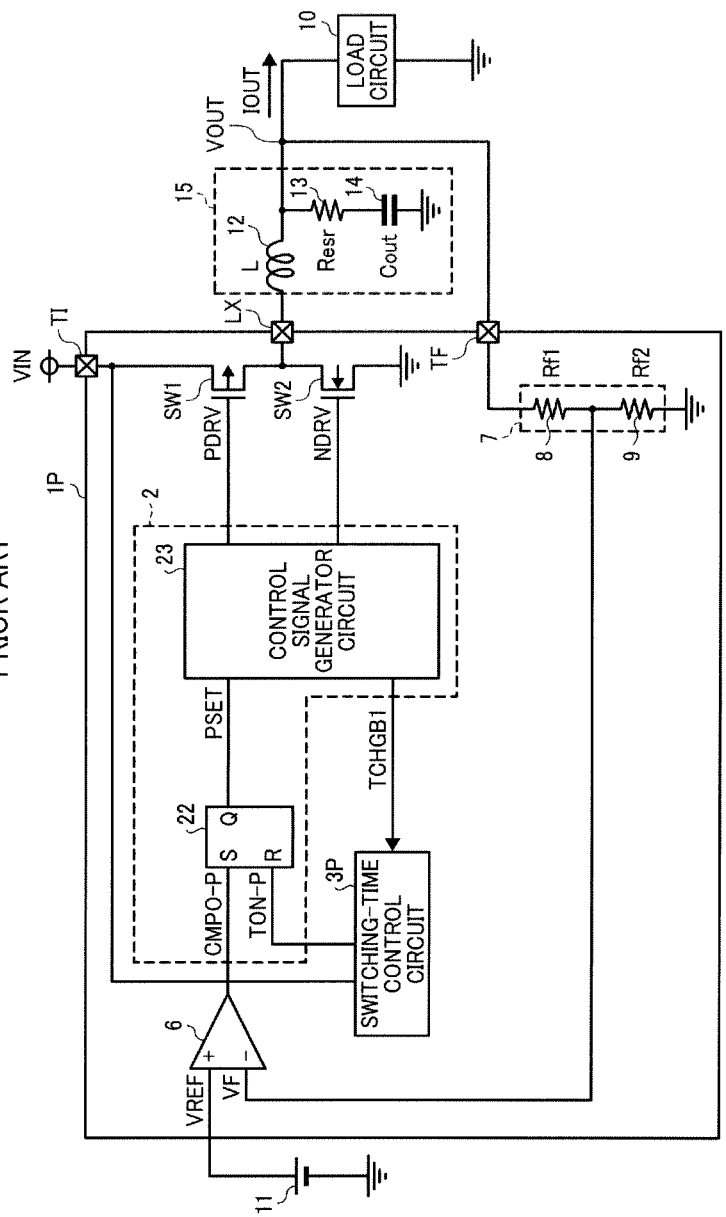
FIG. 6 is a circuit diagram illustrating a conventional switching regulator.
Figure 7:
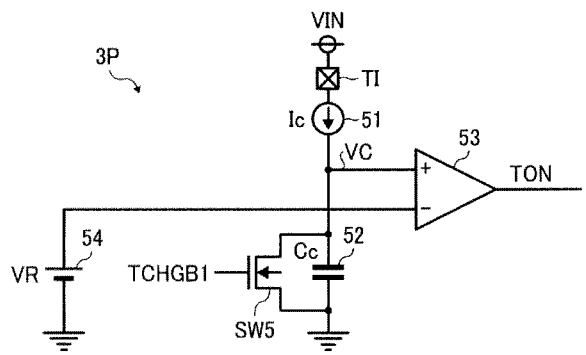
FIG. 7 is a circuit diagram illustrating a switching-time control circuit in the switching regulator shown in FIG. 6.
Figure 8:
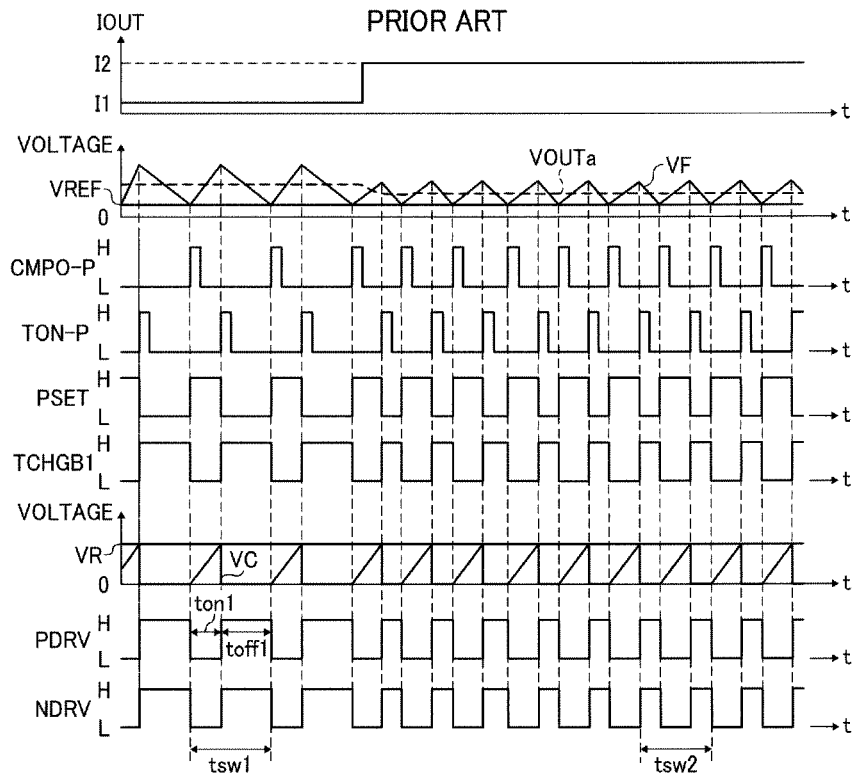
FIG. 8 is a timing chart illustrating operation in the switching regulator shown in FIG. 6.
Figure 9:
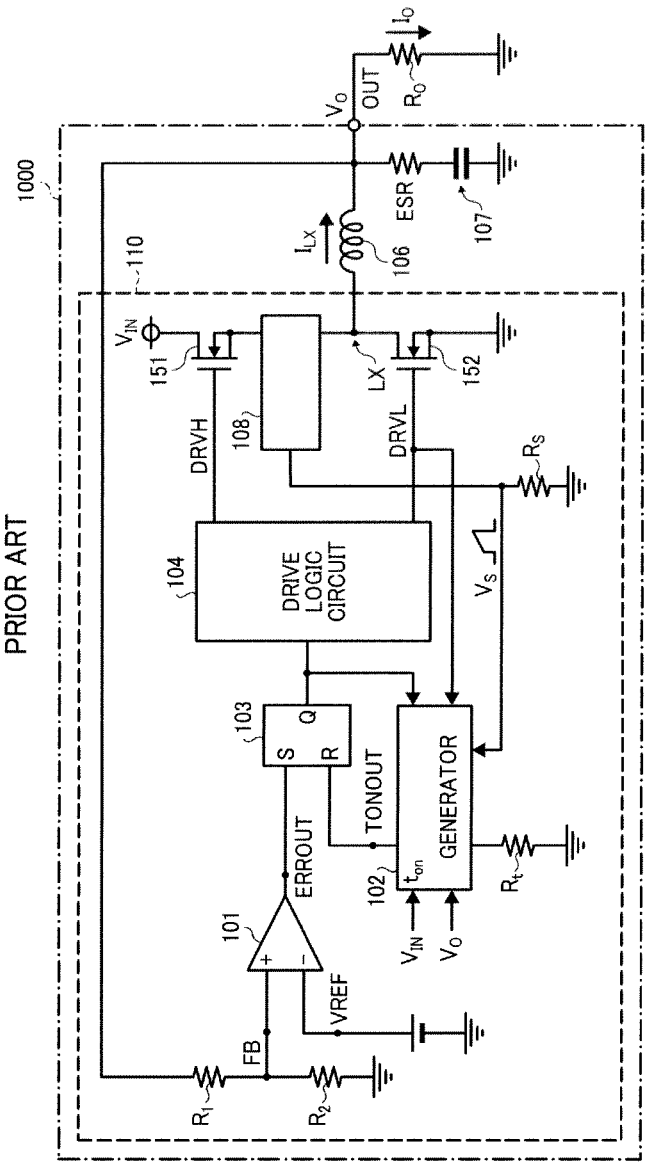
FIG. 9 is a circuit diagram illustrating another conventional power supply device.
Figure 10:
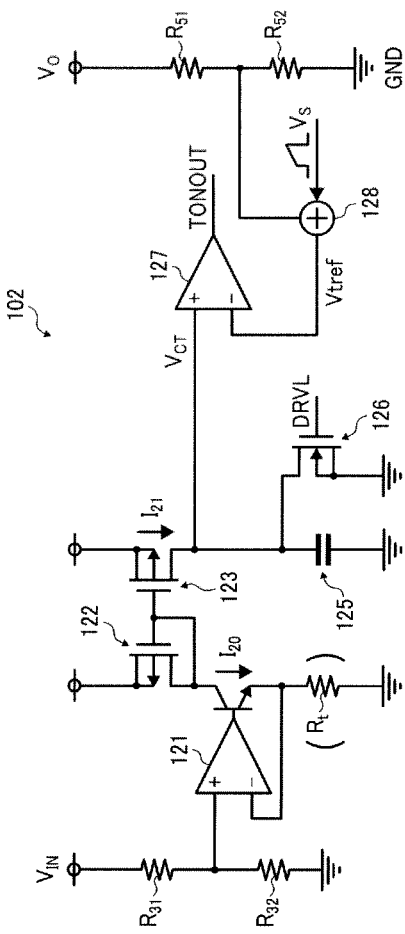
FIG. 10 is a circuit diagram illustrating a $T_{ON}$ generator in the power supply device shown in FIG. 9.

FIG. 5 is a circuit diagram illustrating a switching-time control circuit 3B according to a third embodiment. The switching-time control circuit 3B in the present embodiment includes an ON-duty detection circuit 4B instead of the ON-duty detection circuit 4 in the switching-time control circuit 3 according to the first embodiment.

Herein, the ON-duty detection circuit 4B further includes a dividing circuit 49 to divide the reference voltage VRT for output to the switching element SW3. More specifically, the dividing circuit 49, serving as a first dividing circuit, is connected between the reference voltage source 44 and the third switching element SW3, to divide the second reference voltage VRT for output to the third switching element SW3.

The dividing circuit 49 is constituted by resistors 491 and 492 connected in serial between the reference voltage source 44 and the ground.

Accordingly, in FIG. 5, the capacitor 43 is charged to the reference voltage VRT after dividing, the detected voltage Von1 output from the ON-duty detection circuit 4B is calculated by the following formula, using a resistance Rv1 of the resistor 491 and a resistance Rv2 of the resistor 492.

For example, when an output voltage from a band-gap reference circuit is used for generating the reference voltage VRT, the reference voltage VRT is set to 1.26 V. In the present embodiment, since the reference voltage VRT is divided by the resistors 491 and 492, the maximum value of the detected voltage Von1 is smaller than that of the detected voltage Von1 in the first embodiment. Accordingly, an input voltage range of the comparator 53 becomes smaller, and the consumption of current or the chip size can be further smaller. In addition, the switching regulator 1B can operate at an input voltage VIN lower than that of the first embodiment.

It is to be noted that, similarly to the present embodiment, the dividing circuit 49 shown in FIG. 5 may be provided between the reference voltage source 44 and the switching element SW3 in the on-duty detection circuits 4A of the second embodiment shown in FIG. 4.

In addition, in above-described embodiments, the control-signal generator circuit 23 controls switching elements SW1 and SW2 so that the switching element SW2 is switched on when the switching element SW1 is switched off, and the switching element SW1 is switched on when the switching element SW2 is switched off. However, the present disclosure is not limited to this switching operation. For example, the control-signal generator circuit 23 can generate the switching-element control signals PDRV and NDRV to control the switching elements SW1 and SW2 so that, after the ON-period of the switching element SW1 is finished, both the switching elements SW and SW2 are off in a predetermined margin time, then the switching element SW2 is switched on; and after the ON-period of the switching element SW2 is finished, both the switching elements SW and SW2 are off in a predetermined margin time, then the switching element SW1 is switched on.

Numerous additional modifications and variations are possible in light of the above teachings. It is therefore to be understood that, within the scope of the appended claims, the disclosure of this patent specification may he practiced otherwise than as specifically described herein.

What is claimed is:

1. A switching regulator to convert an input voltage into a predetermined output voltage, the switching regulator comprising:
   an input terminal to which the input voltage is input;
   an output terminal to which the output voltage is output;
   a first switching element connected between the input terminal and the output terminal;
   a second switching element connected between the output terminal and ground;
   a switching-time control circuit to generate a first switching-time control signal indicating finish timing of an ON-period of the first switching element when a first time period, corresponding to a ratio of a length of the ON-period of the first switching element to a sum of lengths of ON-periods of the first switching element and the second switching element, has elapsed from respective reset-release timings;
   a first comparator to compare a feedback voltage corresponding to the output voltage with a predetermined first reference voltage, and generate a second switching-time control signal indicating finish timing of the ON-period of the second switching element when the feedback voltage is smaller than the first reference voltage; and
   a switching-element control circuit to control on/off operation of the first switching element and the second switching element so that the first switching element is turned off and the second switching element is turned on in response to the first switching-time control signal, and the second switching element is turned off and the first switching element is turned on in response to the second switching-time control signal,
   wherein the reset-release timing is designated as a starting point for counting the first time period and a second time period that is longer than the first time period, and the switching-time control circuit generates reset signals when the second time period has elapsed from the rest-release timing.

2. The switching regulator according to claim 1, wherein, when the reset signal is generated and the switching-time control circuit detects that the second switching element is turned off, the switching-time control circuit generates a reset-release signal indicating the reset-release timing, to switch the first switching element on.

3. The switching regulator according to claim 1, wherein, when the switching-time control circuit detects that the second switching element is turned off before the second time period has elapsed from the reset-release timing, based on a predetermined control signal from the second switching element control circuit, the switching-time control circuit switches the first switching element on without generating the reset signal.

4. The switching regulator according to claim 1, wherein the switching-time control circuit comprises:
   an ON-duty detection circuit to output a detected voltage indicating the ratio of the length of the ON-period of the first switching element to the sum of the lengths of the ON-periods of the first switching element and the second switching element;
   a switching-time control-signal generator circuit to generate the first switching-time control signal based on the detected voltage and the reset signal; and
   a reset circuit to generate the reset signal.

5. The switching regulator according to claim 4, wherein the ON-duty detection circuit of the switching-time control circuit comprises:
   a first reference voltage source to generate a predetermined second reference voltage;
   a third switching element having one terminal connected to the first reference voltage source, controlled so that the third switching element is turned on and off in conjunction with the first switching element;
   a fourth switching element having one terminal connected between the other terminal of the third switching element and ground, controlled so that the fourth switching element is turned on and off in conjunction with the second switching element;
   an integral resistive element having one terminal connected to a junction node between the third switching element and the fourth switching element; and a first capacitance element connected between the other terminal of the integral resistive element and ground, wherein the ON-duty detection circuit outputs a voltage across the first capacitance element as the detected voltage, wherein the switching-time control-signal generator comprises:

a reference current source to output a predetermined reference current;

a second capacitive element connected between the reference current source and ground;

a fifth switching element, connected in parallel to the second capacitive element, controlled so that the fifth switching element is switched off at the reset-release timings when the reset signal changes from high to low and is turned on at the reset timing when the reset signal changes from low to high; and a comparator circuit to compare the detected voltage from the ON-duty detection circuit with a voltage across the second capacitive element, and output the first switching-time control signal when the voltage across the second capacitive element is greater than the detected voltage.

6. The switching regulator according to claim 5, wherein the ON-duty detection circuit further comprises a first dividing circuit, connected between the first reference voltage source and the third switching element, to divide the second reference voltage for output to the third switching element.

7. The switching regulator according to claim 5, wherein the reset circuit of the switching-time control circuit comprises;

a second reference voltage source to generate a predetermined third reference voltage that is greater than the second reference voltage;

a second comparator to compare the voltage across the second capacitive element of the switching-time control-signal generator circuit with the third reference voltage and output an output signal indicating the comparison result; and a latch circuit to detect that the second time period has elapsed from the reset-release timing based on the output signal from the second comparator of the reset circuit, and detect that the second switching element is turned off based on a predetermined signal, from the switching element control circuit, indicating a timing that the second switching element is turned off, to control the reset signal to represent the reset timing and the reset-release timing.

8. The switching regulator according to claim 7, wherein the latch circuit comprises NOR gates and an inverter, and wherein, when the output signal from the second comparator of the reset circuit changes from low to high and the second time period has elapsed from the former respective reset-release timings, regardless of the state of the predetermined control signal from the switching element control circuit, the latch circuit of the reset circuit generates a high-level reset signal to switch the fifth switching element of the switching-time control-signal generator circuit from on to off.

9. The switching regulator according to claim 8, wherein, when the output signal from the second comparator is low and the predetermined control signal from the switching element control circuit is changing from low to high as the second switching element is switched from on to off, the latch circuit changes the reset signal from high to low, to switch the fifth switching element of the switching-time control-signal generator circuit from off to on.

10. The switching regulator according to claim 8, wherein, when the output signal from the second comparator is being turned from high to low and the predetermined control signal from the switching element control circuit is high, the latch circuit changes the reset signal from high to low, to switch the fifth switching element of the switching-time control-signal generator circuit from off to on.

11. The switching regulator according to claim 4, wherein the ON-duty detection circuit of the switching period control circuit comprises:

a first reference voltage source to generate a predetermined second reference voltage;

a third switching element having one terminal connected to the first reference voltage source, controlled so that the third switching element is turned on and off in conjunction with the first switching element;

a charge-reference current source, connected to the other terminal of the third switching element, to generate a predetermined charge current;

a fourth switching element having one terminal connected to the ground, controlled so that the fourth switching element is turned on and off in conjunction with the second switching element;

a discharge-reference current source, connected between the other terminal of the fourth switching element and the charge-reference current source, to output a predetermined discharge current; and a first capacitance element connected between the ground and a junction node between the charge-reference current source and the discharge-reference current source, wherein the ON-duty detection circuit outputs a voltage across the first capacitance element as the detected voltage;

wherein the switching-time control signal generator circuit comprises:

a reference current source to output a predetermined reference current;

a second capacitive element connected between the reference current source and the ground;

a fifth switching element, connected in parallel to the second capacitive element, controlled so that the fifth switching element is switched off at the reset-release timings when the reset signal changes from high to low and is turned on at the reset timing when the reset signal changes from low to high; and a comparator circuit to compare the detected voltage from the ON-duty detection circuit with a voltage across the second capacitive element, and output the first switching-time control signal when the voltage across the second capacitive element is greater than the detected voltage.

12. The switching regulator according to claim 11, wherein the ON-duty detection circuit further comprises a first dividing circuit, connected between the first reference voltage source and the third switching element, to divide the second reference voltage for output to the third switching element.

13. The switching regulator according to claim 11, wherein the reset circuit of the switching-time control circuit comprises:

a second reference voltage source to generate a predetermined third reference voltage that is greater than the second reference voltage;

a second comparator to compare the across the second capacitor of the switching-time control-signal generator circuit with the third reference voltage and output an output signal indicating the comparison result; and a latch circuit to detect that the second time period has elapsed from the reset-release timing based on the output signal from the second comparator of the reset circuit, detect that the second switching element is turned off based on a predetermined signal, from the switching-element control circuit, indicating a timing that the second switching element is turned off, generate the reset signals based on the detection result.

14. The switching regulator according to claim 13, wherein the latch circuit comprises NOR gates and an inverter, and
wherein, when the output signal from the second comparator of the reset circuit changes from low to high and the second time period has elapsed from the former respective reset-release timings, regardless of the state of the predetermined control signal from the switching element control circuit, the latch circuit of the reset circuit generates a high-level reset signal to switch the fifth switching element of switching-time control-signal generator circuit from on to off.

15. The switching regulator according to claim 14, wherein, when the output signal from the second comparator is low and the predetermined control signal from the switching element control circuit is changing from low to high as the second switching element is switched from on to off, the latch circuit changes the reset signal from high to low, to switch the fifth switching element of the switching-time control-signal generator circuit from off to on.

16. The switching regulator according to claim 14, wherein, when the output signal from the second comparator is being turned from high to low and the predetermined control signal from the switching element control circuit is high, the latch circuit changes the reset signal from high to low, to switch the fifth switching element of the switching-time control-signal generator circuit from off to on.

17. The switching regulator according to claim 1, further comprising a second dividing circuit to generate the feedback voltage corresponding to the output voltage and output the feedback voltage to the first comparator.

18. The switching regulator according to claim 1, wherein the switching-element control circuit controls the first switching element and the second switching element to cause a time-averaged voltage of the output voltage to be substantially constant.

19. An electronic device comprising the switching regulator of claim 1.

20. The electronic device switching according to claim 9, further comprising a low-pass filter connected to the output terminal of the switching regulator,
wherein the output voltage is output through the low-pass filter.

* * * * *